United States Patent [19]

Jacobsson et al.

[11] Patent Number: 4,774,782
[45] Date of Patent: Oct. 4, 1988

[54] METHOD OF HANDLING FISHING EQUIPMENT AND AN ARRANGEMENT FOR CARRYING OUT THE METHOD

[76] Inventors: Leif Jacobsson, Tingsgatan 23; Roland Ulfling, Ångsvågen 44, both of S-362 00 Tingsryd, Sweden

[21] Appl. No.: 893,316
[22] PCT Filed: Nov. 23, 1985
[86] PCT No.: PCT/SE85/00482
   § 371 Date: Jul. 23, 1986
   § 102(e) Date: Jul. 23, 1986
[87] PCT Pub. No.: WO86/03098
   PCT Pub. Date: Jun. 5, 1986

[30] Foreign Application Priority Data

Nov. 23, 1984 [SE] Sweden ............................ 8405910

[51] Int. Cl.⁴ .............................................. A01K 79/00
[52] U.S. Cl. ....................................... 43/4.5; 43/27.4
[58] Field of Search .............. 242/84.1 A; 43/4.5, 43/27.4

[56] References Cited

U.S. PATENT DOCUMENTS

| | | | |
|---|---|---|---|
| Re. 28,380 | 4/1975 | Tison | 43/27.4 |
| 3,126,166 | 3/1964 | Weinberg | 242/84.11 |
| 3,201,890 | 8/1965 | Griggs | 43/4.5 |
| 3,903,632 | 4/1974 | Tison et al. | 43/6.5 |
| 4,107,865 | 9/1978 | Alex | 43/27.4 |
| 4,250,648 | 3/1979 | Jacobsen | 43/4 |

FOREIGN PATENT DOCUMENTS 511151 of 1920 France ............................ 43/4
WO84/03687 9/1984 World Int. Prop. O. .

OTHER PUBLICATIONS

New Hope for Longlining, 9/71.

Primary Examiner—Nicholas P. Godici
Assistant Examiner—Karen Skillman
Attorney, Agent, or Firm—Howson & Howson

[57] ABSTRACT

In a method for handling of fishing equipment and lines (6) in the fishing equipment, particularly trotlines from crafts (13), and where the lines are provided with numerous hooks, the lines are arranged for setting out and hauling in on a reel (1). According to the invention a second drum (3) is arranged, from which a web (7) is unwound and brought to be wound on a first drum (2) or on an in one piece with the reel (1) shaped first drum, whereby one or a number of hooks and/or at least parts of leaders are separated from a second or a second number of hooks and/or at least parts of leaders with the aid of a layer of the web (7). During the setting out of lines (6) the web (7) is wound on the second drum (3), whereby the reel (1) or the first drum (2) are rotated by the web during its winding on the second drum and the hooks and/or the leaders are subsequently released from the wound web and set out. During the hauling in of the lines (6) the web (7) is unwound from the second drum (3) and wound on the first drum (2) during cassetting of hooks and leaders between the layers of the web being wound.

16 Claims, 2 Drawing Sheets

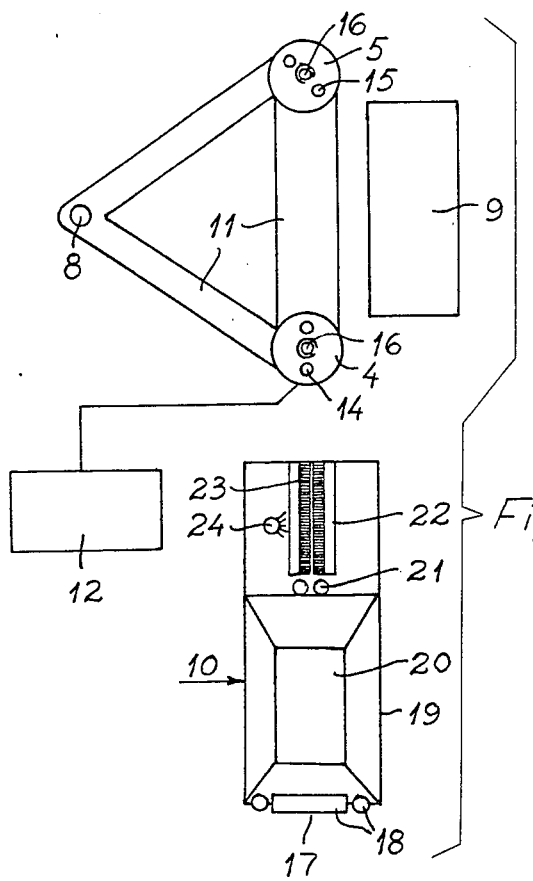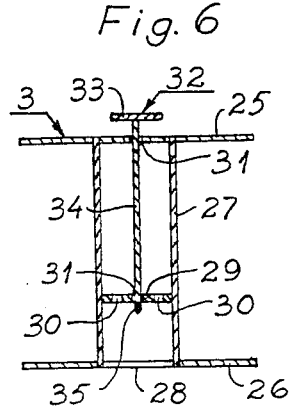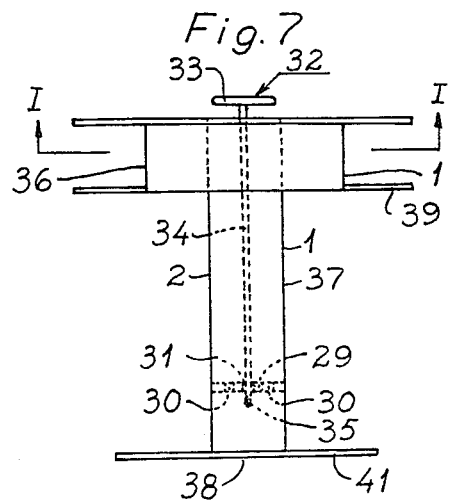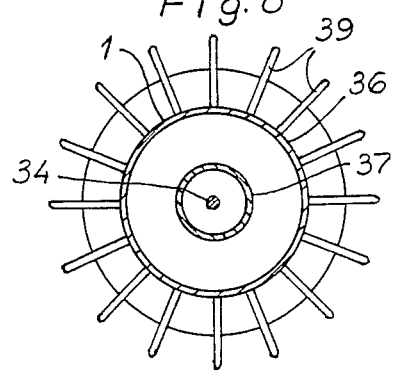

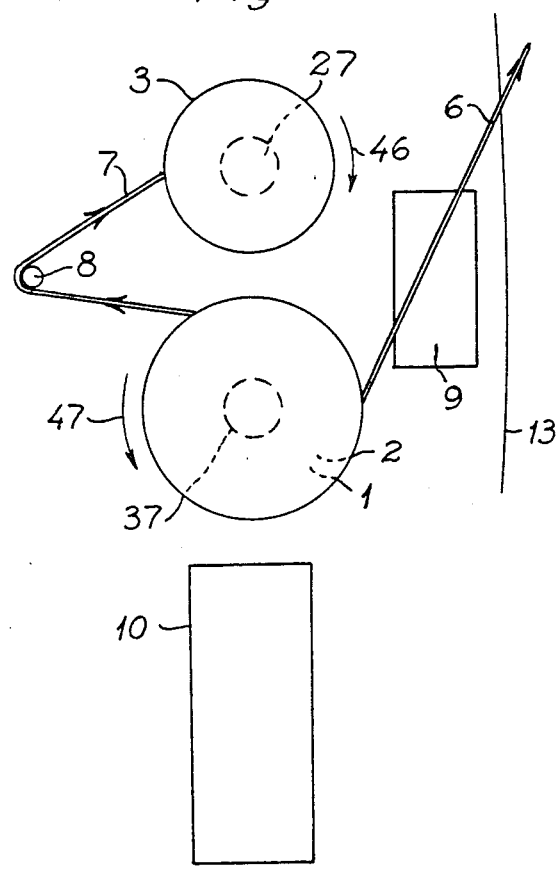
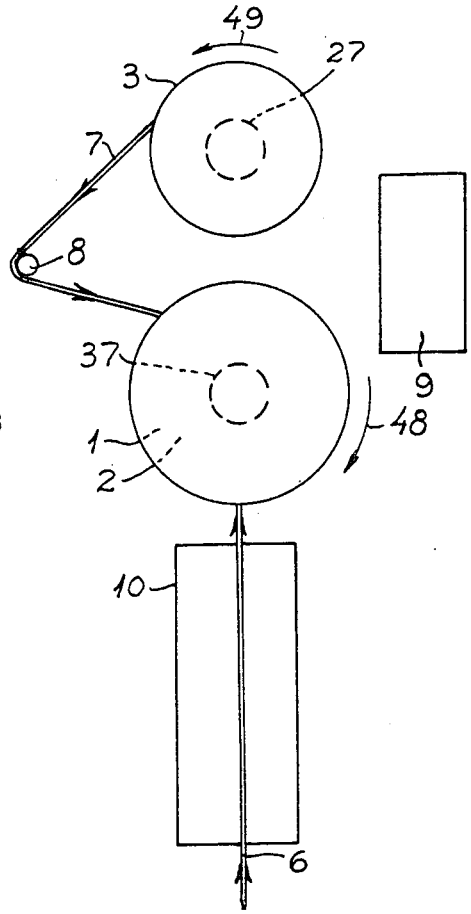
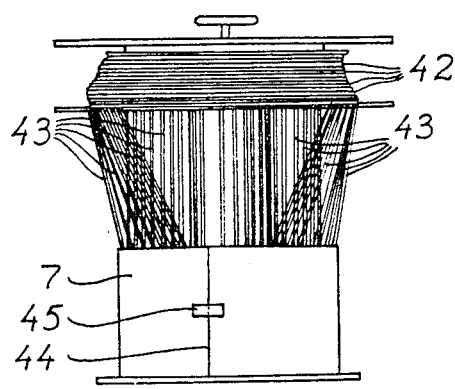

METHOD OF HANDLING FISHING EQUIPMENT AND AN ARRANGEMENT FOR CARRYING OUT THE METHOD

TECHNICAL FIELD

The present invention relates to a method of handling fishing equipment and lines in the fishing equipment, particularly trotlines and preferably when the fishing equipment is handled from boats. By way of example trotlines are provided with numerous hooks.

BACKGROUND

There is a need for a simplified method of handling fishing equipment and lines, which may be considered to be particularly accentuated in the case of fishermen with lesser vessels but also for other fishermen, such as the large vessels of the fishing industry. It is well-known, for example, that a trotline is commonly 500 meters long, but often 1,000 meters long and even longer, and equipped with several hundred hooks and just as many leaders.

TECHNICAL PROBLEMS

Not only are the lines handled for the main part manually, for example trotlines, but in most cases the entire fishing equipment is basically handled manually at the present time, which implies extensive work with the equipment, especially after the catch, when the lines are sorted out before the next fishing trip. Such back-up work takes many hours. Moreover, the manual handling of fishing equipment requires the participation of several persons in spite of which it is time consuming. Manual handling also results in the limitation of trotline length and thus the number of hooks. In this context equipment for the storing of hooks and leaders has been proposed, but the equipment has proved to be complicated in its design and utilization and also takes up too much space. Moreover, the equipment is so costly to manufacture that not even professional fishermen with large fishing vessels can afford to acquire this equipment. Baiting and baiting-off devices have also been proposed to simplify the handling of the fishing equipment.

THE SOLUTION

The utilization of a method according to the invention enables handling to be carried out principally by autonomously working devices, which may be linked to a power source, whereby automatic handling of the fishing equipment can be achieved. Back-up work with the fishing equipment after the catch is totally avoided, and also the setting and hauling in of lines. The method can also include automatic baiting and baiting-off, whereby the fishing equipment does not require management of a person, but the person commanding the boat can simultaneously steer the method with any manual handling of the actual fishing equipment. Neither does the method necessitate a limitation of the length of lines and thus the number of hooks in its utilization. Moreover, the method can be carried out at a low cost, within the means of all professional fishermen, which are primarily in need of a simplified handling of the fishing equipment. The method in accordance with the invention is thus characterized by the lines being arranged for setting out and hauling in on a reel or similar, and further that a second drum, roll, bobbin or the like is arranged, from which a web is unwound and brought with at least a part of its length to be wound on a first drum or on an in one piece with the reel shaped first drum, whereby one or a number of hooks and/or at least parts of leaders are separated from a second or a second number of hooks and/or at least parts of leaders with the aid of at least one layer of the web or a layer in the web. One can say that hooks and leaders are cassetted with the aid of the web during the hauling in and storage of the lines.

In accordance with another characteristic of the method the second drum and the reel or the first drum are driven with the aid of their own motor, whereby during the setting out of lines the motor for the reel or the first drum is brought to free wheel, while the motor for the second drum is brought to drive the second drum for winding of the web on the second drum, whereby the reel or the first drum is driven or rotated by the winding of the web on the second drum and that the hooks and/or the leaders are subsequently released from the wound web and set out.

According to a further characteristic of the method the line passes, when being set out, a baiting device for baiting of the hooks and as per one more characteristic the lines pass, when being hauled in, through a baiting-off device for baiting-off of fish and preferably thereafter also through a cleaning unit for cleaning of the lines with accompanying leaders and hooks. The invention also relates to an arrangement which is intended to handle fishing equipment and lines in fishing equipment when carrying out of the method in accordance with the invention. The arrangement hereby comprises a reel or similar to hold the lines. The arrangement is characterized by the fact that it comprises a second drum, roll, bobbin or the like for a web and a first drum, roll, bobbin or the like for winding of the web, when the lines are hauled in, whereby said first drum may be joined to the reel.

Such an arrangement is of simple manufacture and easy to handle and may be well dimensioned and also produced at a low cost.

BRIEF DESCRIPTION OF THE DRAWINGS

Further characteristics of and advantages with the method and the arrangement in accordance with the invention will be apparent by an embodiment in the following description, whereby simultaneous reference will be made to the accompanying schematic drawings, in which FIG. 1 shows from above an example of an arrangement according to the invention although without arranged reels and/or drums, FIG. 2 shows from the side a part of the arrangement in FIG. 1, FIG. 3 shows in a schematic view a part of a baiting-off device included in the example according to FIG. 1, FIG. 4 shows from above in a schematic view an arrangement according to the invention during the setting out of a line, FIG. 5 shows from above in a schematic view an arrangement according to the invention during the hauling in of a line, FIG. 6 shows in section a drum included in the arrangement, FIG. 7 shows from the side a reel or an another drum included in the arrangement, FIG. 8 shows the arrangement according to FIG. 7 in the section I—I, and FIG. 9 shows the reel or the drum according to FIG. 7 after hauling in the lines and storage of these.

BEST MODE FOR CARRYING OUT THE INVENTION

The arrangement, which is to be used on a vessel for the handling of fishing equipment and lines of fishing equipment, comprises a reel 1 for one or several lines 6, from which are hung implements, comprising for example leaders and hooks on a trotline. The reel 1 may be shaped in one piece with a first drum 2 for cassetting of leaders an hooks with the aid of a web 7. Moreover, the arrangement comprises a second drum 3 for the taking up of the web 7. The drums 2, 3 may consist of a roll, bobbin or similar. The reel 1, the first drum 2 or in case where the reel 1 and the first drum 2 are shaped in one piece with each other, reel 1 and drum 2 and the second drum 3 may be arranged or connectable to one or preferably their own motor 4, 5 for machine handling and running of the arrangement. Thus, the reel 1 and/or the first drum 2 may be arranged on a first motor 4 and the second drum 3 on a second motor 5. The motors 4, 5 may for example comprise hydraulic motors. As indicated in FIG. 1 the motors 4, 5 may be arranged on a frame 11 or a base, which may also display a hold 8 and be provided with other appropriate implements.

With further reference to FIG. 2 the motors 4, 5 may be provided with one part of a joining device 14, 15, which may comprise protruding pins connected to the motor. The second part of the joining device comprises as per the proposed example recesses, holes or through holes 30 or similar, which are arranged in a connecting device 29, which the second drum 3 displays, see FIG. 6, and the first drum 2 and/or the reel 1 displays, see FIG. 7. Said connecting device 29 also displays a through hole 31 for a locking device 34 in the form of a lengthwise rod, which is arranged in the reel 1 and/or the first drum 2 and also the second drum 3. With the aid of the locking device 34 the reel and the drums may be secured to the respective motors 4, 5, which display a first part in a locking device or an engagement device 16 in the form of a recess or a hole with an internal thread. The second part of the locking device or the engagement device is shaped at the end on the lengthwise rod 34 and is in the form of a thread 35 or another locking device or engagement device. Via the locking device or the engagement device it is possible to prevent the reel and the drums jumping out of their position on the respective motor during for example the heaving of the sea. The locking device in the form of the lengthwise rod also comprises a control device 33 managed for the locking of the locking device reaching through a through hole 32. The control device is, for example, in the form of a handle or the like.

The drum 2 or the drums 2, 3 also display at a distance from each other arranged flanges 25 and 26 respectively, whereby a through hole 32 is arranged in the flange 25. Between the flanges 25, 26 a bobbin 27 is arranged or shaped in the form of a hollow cylinder or similar.

The reel 1 also displays a flange as a flange for a bobbin or drum 36, round which the lines 6 are to be wound. At a distance from said flange 40 holding devices 39 are arranged for the lines, whereby the flange and the holding devices limit the drum, on which the lines are to wound. According to the shown embodiment in FIG. 7 the reel 1 and the first drum 2 are shaped in one piece with each other, whereby said flange 40 comprises a flange in the reel and the drum, while the second flange in the drum is shown with the reference designation 41. In the drum 2 a bobbin 37 is extended in the same or a similar manner as in the case of the second drum 3. The bobbin is in the form of for example a hollow cylinder or the like and is arranged to be extended between flanges. According to the example the drum 36 for the winding up of lines displays a considerably lager diameter than the bobbin 37, whereby the lower edge or the end edge of the drum may display a wall or similar, which forms a flange in the drum 2. In the flanges 26 and 41 of the reel 1 or the drums 2, 3 or in the one end of the respective bobbins 27, 37 an opening 28 or 38 respectively is arranged, whereby the reel and the drums may be arranged on the motors and the locking device or the engagement device may be advanced to a locking engagement with the motors.

The height of the bobbin 37 in the reel 1/drum 2 displays a height which is preferably the same as or greater than the length of the leaders with accompanying hooks and potential attachment implements, which the lines 6 display. Moreover, the height of the bobbin 37 exceeds the width of the web 7. The height of the bobbin 27 on the second drum 3 also exceeds the width of the web.

The arrangement may also include a baiting device 9, which is arranged to be passed by the lines 6 for baiting of bait during the setting out of the lines. Moreover, the arrangement may also include a baiting-off device, through which the lines 6 will pass during the hauling in of the lines for reeling on the reel 1. Moreover, the arrangement may also include a control panel 12 for the operation of the machinery in the arrangement if the arrangement is equipped with machinery, that is, operation of the motors, rinsing by fluid, etc.

The baiting-off device 10 displays an inlet 17 or an intake, which is shaped as an opening, limited by rollers 18. With the reference designation 19 is shown a body or walls in the baiting-off device and with the reference designation 20 a drop hole for baited-off fish. During baiting-off of fish the lines 6 with leaders and hooks pass through the inlet 17, whereby the fish is baisted-off and drops down into the drop hole. The baiting-off device 21 may consist of a pair of rollers. The lines continue through the baiting-off device to a cleaning unit 22, which includes cleaning devices 23, in the form for example of brushes and rinsing equipment 24 for rinsing liquid, whereby the rinsing liquid may comprise water under pressure.

In FIG. 4 is shown in a schematic view the setting out for example of a trotline. The arrangement is arranged along a rail or gunwale 13 on a ship. Setting out is carried out on the quater, that is, the ship is advanced slowly forwards and the lines released at an angle backwards. The web 7 is hereby attached to the second drum 3 and the motor 5 for the second drum drives, see arrow 46. The web will hereby be wound on the drum 3 via the passage of a hold 8, arranged on the frame 11. The motor for the reel 1 or the first drum 2 is hereby disengaged. The lines run through the baiting device 9.

In FIG. 5 is shown in a schematic view the hauling in of the lines 6, whereby the lines pass through the baiting-off device 10 and are taken in on the bow on the ship. The motor 4 for the reel and/or the first drum 2 is hereby driven, see arrow 48, while the second drum 3 is disengaged. The lines 6 are hereby reeled onto the reel 1 and the leaders 43 with hooks hang from the reel 1 through the holding devices 39 and along the bobbin 37 of the first drum 2. At the same time the web 7 is wound around the bobbin 37 and each hook with at least a part of its leader or a number of hooks with accompanying parts of leaders will hereby come in each turn of the web 7 roller to be separated from a second hook and at least a part of its leader or a second number of hooks and/or at least parts of their leaders. In this manner hooks and parts of their leaders will be held separate and at a distance from each other with the aid of the web 7. After the hauling in and reeling up of the lines 6 the web 7 may after being released from the second drum 3 be closed with a tape 45 and the hooks with accompanying leaders or parts of leaders be cassetted by the web 7.

The web may be manufactured of plastic material, for example a nylon, fabric, wet strength paper or similar. Moreover, the web displays a width such that it ensures the winding and containment between the web layers of hooks and preferably also part of each leader. Thus, in FIG. 9 are shown the wound lines 42, leaders 43 with hooks and the end 44 of the web 7, secured with a tape 45 or similar. With the reference designation 47 is shown the rotation of the reel or the drum and with the reference designation 49 is shown the direction of rotation of the second drum 3 when the web 7 is unwound for cassetting of leaders and hooks.

The trotline is a fishing equipment which can be handled according to the method or by means of the arrangement according to the invention but it is also possible to consider other fishing equipment where the invention may be utilized. The arrangement is primarily intended for fishermen using a boat and hook fishing equipment. The arrangement should be arranged along a rail with reel 1 and/or the first drum 2 arranged forward and the second drum 3 arranged aft. Setting out of lines 6 takes place on the quater and hauling in of lines takes place on the bow. The lines 6 may laid on the bottom during fishing or provided with floats so that they float. When the lines are not anchored they are called drifting lines.

When setting out of lines 6 the end 44 of the web 7 is disengaged and attached on the bobbin 27 of the drum 3. The attachment of the web can, for example, be secured with a tape. The drum 3 is subsequently driven by the motor 5, whereby the web 7 is wound on the drum 3 and unwound from the drum 2. The release of the leaders 43 and hooks hereby takes place and the lines 42 are unwound from the reel 1. The reel 1 or the drum 2 is hereby disengaged and rotates via the winding of the web on drum 3. When the lines are hauled in the web is secured or being secured to the drum 2 or its bobbin 37 and the drum and the reel 1 are driven by the motor 4 for hauling in and winding of the lines 6 and also cassetting of leaders and hooks. The motor 5 for the drum 3 may hereby be disengaged, since unwinding takes place via the winding of the web on the drum 3.

During trails with a method in accordance with the invention, whereby the illustrated arrangement was used, 1,000 meters of lines were used, which were provided with a total of 500 leaders, that is, the leaders were arranged at 2 meters gaps. Leaders are normally arranged at a distance of between 1.5 to 3 meters from each other along the lines. The web was of plastic material and the lines of standard material with nylon leaders and hooks. The method and the arrangement proved itself to function excellently without necessitating manual handling of the fishing equipment. The fishing equipment was operated with the aid of a control panel and by the person who commanded the ship. Baiting and baiting-off devices were used during the trial without complication.

Without exceeding the conceptional scope of the invention modifications of the shown and described method and arrangement should be possible. Thus, the reel, drum, or drums may display a different design. The frame and motors may be of a different type, and also the locking arrangement for the drums and reel. The method and the arrangement may also be used for an arrangement arranged for manual handling or an arrangement which is designed for only partially automatic operation. An example of such arrangements could be an arrangement without motors, baiting device and/or baiting-off device. However, the technique appears to be best employed during an arrangement arranged for automatic operation. The drum 2 may have a greater inner diameter so that the leaders are cassetted in a more vertical extension. The method and the arrangement in accordance with the invention are thus not restricted to what has been indicated by the embodiment but only to the following claims.

We claim:

1. A method of handling trotlines in fishing wherein the lines are provided with numerous hook and leader combinations, characterized in that the lines (6) are set out and hauled in on a reel (1) and during hauling in of the lines (6) a web (7) is unwound from a second drum (3) and wound on a first drum (2) in such a way that at least parts of a first group of hook and leader combinations are separated from at least parts of a second group of hook and leader combinations by at least one layer of the web.

2. A method in accordance with claim 11, characterized in that said first drum (2) and said second drum (3) are arranged to be driven with the aid of their own motors (4, 5), whereby during setting out of lines (6) the motor (4) for the first drum (2) is allowed to free wheel, while the motor (5) for the second drum (3) drives the second drum (3) for winding of the web (7) on the second drum, whereby the first drum (2) is driven or rotated by the winding of the web (7) on the second drum (3) and the hook and leader combinations are released from the web wound on the first drum (2) and set out.

3. A method in accordance with claim 1, characterized in that the lines (6), when being set out, pass baiting means (9) for baiting of the hooks.

4. A method in accordance with claim 2, characterized in that the lines (6), when being set out, pass baiting means (9) for baiting of the hooks.

5. A method in accordance with claim 1, characterized in that the lines (6), when being hauled in, pass through means (10) for baiting-off of fish and thereafter through a means (22) for cleaning the lines with accompanying leaders (43) and hooks.

6. A method in accordance with claim 2, characterized in that the lines (6), when being hauled in, pass through means (10) for baiting-off of fish and thereafter through a means (22) for cleaning the lines with accompanying leaders (43) and hooks.

7. An arrangement intended for the handling of trotlines in fishing comprising a reel (1) to hold the lines (6), characterized in that the arrangement comprises a web (7) arranged for separating at least parts of hook and leader combinations from one another and first and second drums (2, 3) for unwinding and rewinding the web.

8. An arrangement in accordance with claim 7, characterized in that the second drum (3) and the first drum (2) are driven by their own hydraulic motors (4, 5).

9. An arrangement in accordance with claim 8, characterized in that the motors (4, 5) are arranged on a frame (11), the frame also supporting a hold (8) for running the web between the drums (2, 3).

10. An arrangement in accordance with claim 8, characterized in that at least one of the drums (2, 3) is provided with a selectably engageable connecting device (29) for connection to its own motor (5 and 4 respectively), said motor having protruding pins (14, 15) for engagement with the connecting device.

11. An arrangement in accordance with claim 8, characterized in that at least one of the reel (1) and the drums (2, 3) is provided with a locking device (32) for securing the same to one of the motors (4, 5), said one of the motors having an engagement device (16) for the engagement with said locking device.

12. An arrangement in accordance with claim 10, characterized in that at least one of the reel (1) and the drums (2, 3) is provided with a locking device (32) for securing the same to one of the motors (4, 5), said one of the motors having an engagement device (16) for the engagement with said locking device.

13. An arrangement in accordance with claim 7, characterized in that the reel (1) and the first drum (2) are rotatable together on a common axis and in which one flange (41) of the first drum (2) is located at a distance from the reel which is at least approximately equal to the lengths of the leaders (43) with accompanying hooks and attachment means, and in which the width of the web (7) is sufficient to ensure containment of the hooks between the web layers as the web is wound on the first drum (2).

14. An arrangement in accordance with claim 10, characterized in that the reel (1) and the first drum (2) are rotatable together on a common axis and in which one flange (41) of the first drum (2) is located at a distance from the reel which is at least approximately equal to the lengths of the leaders (43) with accompanying hooks and attachment means, and in which the width of the web (7) is sufficient to ensure containment of the hooks between the web layers as the web is wound on the first drum (2).

15. An arrangement in accordance with claim 11, characterized in that the reel (1) and the first drum (2) are rotatable together on a common axis and in which one flange (41) of the first drum (2) is located at a distance from the reel which is at least approximately equal to the lengths of the leaders (43) with accompanying hooks and attachment means, and in which the width of the web (7) is sufficient to ensure containment of the hooks between the web layers as the web is wound on the first drum (2).

16. An arrangement in accordance with claim 12, characterized in that the reel (1) and the first drum (2) are rotatable together on a common axis and in which one flange (41) of the first drum (2) is located at a distance from the reel which is at least approximately equal to the lengths of the leaders (43) with accompanying hooks and attachment means, and in which the width of the web (7) is sufficient to ensure containment of the hooks between the web layers as the web is wound on the first drum (2).

* * * * *